No. 626,569. Patented June 6, 1899.
W. SERGEANT.
APPARATUS FOR CATCHING WASTE PRODUCTS FROM LEAD, SILVER, OR OTHER SMELTERS.
(Application filed Feb. 20, 1899.)
(No Model.)
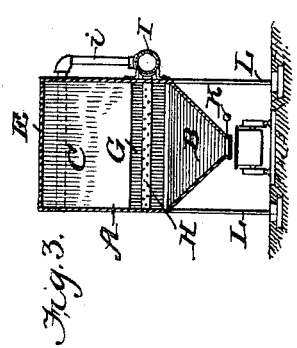
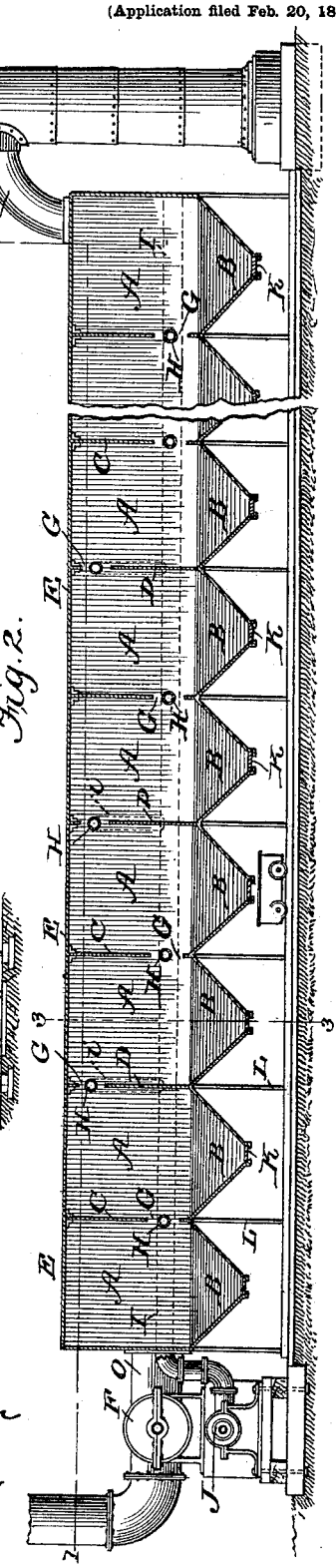
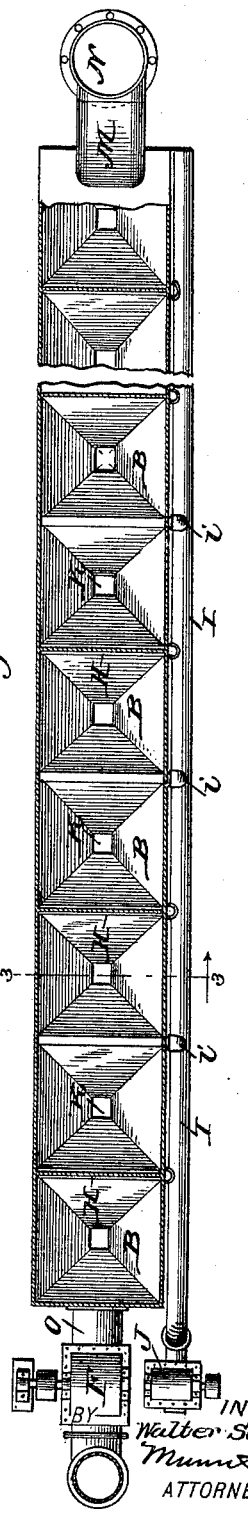
WITNESSES:
Jos. A. Ryan
P. B. Turpin
INVENTOR
Walter Sergeant.
Munn & Co.
ATTORNEYS.
THE NORRIS PETERS CO., PHOTO-LITHO., WASHINGTON, D. C.

UNITED STATES PATENT OFFICE.

WALTER SERGEANT, OF EL PASO, TEXAS.

APPARATUS FOR CATCHING WASTE PRODUCTS FROM LEAD, SILVER, OR OTHER SMELTERS.

SPECIFICATION forming part of Letters Patent No. 626,569, dated June 6, 1899.

Application filed February 20, 1899. Serial No. 706,137. (No model.)

*To all whom it may concern:*

Be it known that I, WALTER SERGEANT, residing at El Paso, in the county of El Paso and State of Texas, have invented certain new and useful Improvements in Apparatus for Catching the Waste Products from Lead, Silver, or other Smelters, of which the following is a specification.

My invention is an improvement in apparatus for catching waste products from smelters, and has for an object, among others, to provide improved means for introducing a spray of cold air into and against the draft from the smelters through the various settling-chambers; and the invention consists in certain novel constructions and combinations of parts, as will be hereinafter described, and pointed out in the claims.

The present invention is in the nature of an improvement of the apparatus shown in the patent, No. 597,660, issued to J. B. Sergeant January 18, 1898, which patent is now owned by me.

In the drawings, Figure 1 is a sectional plan view on about line 1 1 of Fig. 2. Fig. 2 is a vertical longitudinal section, and Fig. 3 is a cross-section on about line 3 3, Figs. 1 and 2, of an apparatus embodying my invention.

In carrying out my invention I provide in a suitable casing a series of chambers A, which I term "settling-chambers" and which together form a passage or trail through which the fumes and waste products are conducted from the smelter to the stack. Each settling-chamber has a hopper-like bottom B, and they form a circuitous passage for the fumes and waste products by means of the baffle-plates C and D, which are arranged alternately and project the former from the top E of the passage and the latter upward nearly to such top. These baffle-plates, it will be seen, cause the fumes and waste products to travel in a zigzag line through the passage formed by the several settling-chambers, whereby I secure better results in effecting the discharge or separation from the fumes or gases of all the metallic substances, which are condensed and deposited in the hoppers of the settling-chambers, the gases passing on to the stack and discharging into the air or otherwise, as desired.

An exhaust-fan F is provided for the purpose of forcing the fumes and waste products of the smelter through the settling-chambers.

As best shown in Fig. 2, a narrow space is provided alongside the free edges of the baffle-plates C and D. To effectually subject the fumes and waste products to the action of the cold air for the purpose of precipitating, condensing, and throwing down into the hoppers all of the metallic substances, I provide in the narrow spaces G alongside the free edges of the baffle-plate the spray-pipes H, which extend transversely across the passage or trail for the fumes and have numerous spraying-openings, which tend to discharge cool air, supplied as presently described, into and against the draft of the fumes through the trail formed by the several settling-chambers. By reason of the alternate arrangement of the baffle-plates the spray-pipes are arranged in two series, one above the other. One series is supplied with air from the main I, which leads from the blower J, and the pipes of the other series are supplied by branch pipes $i$, leading from the main I, as will be understood from the drawings.

Gates K control the discharge-openings of the hoppers of the settling-chambers and a suitable track is provided below the trail for a car, wheelbarrow, or other suitable receptacle, the settling-chambers being elevated on posts or standards L, as will be understood from Figs. 2 and 3.

A suitable pipe M leads from the last settling-chamber into the stack N.

In the operation of my invention the fumes and waste products are drawn by the exhaust-fan through the pipe O and are forced through the trail, formed by the settling-chambers coming in contact and mixing with the cold air from the spray-pipes, thus cooling the fumes, neutralizing the gases, and precipitating and throwing down into the hoppers all of the metallic substances, allowing the gases to escape from the stack.

Having thus described my invention, what I claim, and desire to secure by Letters Patent, is—

1. The herein-described apparatus for catching the waste product from smelters consisting of the trail or passage composed of the settling-chambers arranged in succession and having the hopper-shaped bottom, the baffle-plates extending alternately up and down between the settling-chambers, the transverse air spray-pipes extending adjacent to the free edges of the baffle-plates, the exhaust-fan for forcing the fumes and waste products through the trail or passage, the air-main and fan for forcing the air through such main and connections between the main and the air spray-pipes substantially as set forth.

2. In an apparatus substantially as described the combination of the longitudinally-extended trail or passage for the fumes, the transverse baffle-plates alternately arranged therein and having narrow passages alongside their free edges, and the transverse air spray-pipes extending adjacent to the free edges of the baffle-plates substantially as set forth.

3. In an apparatus substantially as described the combination of the series of settling-chambers having hopper-shaped bottoms and devices controlling the same, the standards whereby said settling-chambers are held in an elevated position, the alternately-arranged baffle-plates partially separating the said chambers, the transverse air spray-pipes located between the settling-chambers and the main connected with said pipes substantially as set forth.

WALTER SERGEANT.

Witnesses:
CHARLES H. MAYDWELL,
C. D. MCCLINTOCK.